Aug. 11, 1959    S. LEDERMAN ET AL    2,899,525
METHOD OF IMPROVING INDUCTION HEATING EFFICIENCY
Filed April 24, 1958    4 Sheets-Sheet 1

INVENTORS
SAMUEL LEDERMAN
WILLIAM R. MAC LEAN
BY
ATTORNEYS

Aug. 11, 1959  S. LEDERMAN ET AL  2,899,525
METHOD OF IMPROVING INDUCTION HEATING EFFICIENCY
Filed April 24, 1958  4 Sheets-Sheet 2

LEGEND:
THICKNESS OF COATING

- ∕ 9.82 × 10⁻³
- • 10.77
- -- 11.09
- × 7.50
- + 7.73
- \ 4.76
- \ 2.19
- ¦ 2.05

INVENTORS
SAMUEL LEDERMAN
WILLIAM R. MAC LEAN
BY
Wade Koontz
Arnold H. Cole
ATTORNEYS Aug. 11, 1959  S. LEDERMAN ET AL  2,899,525
METHOD OF IMPROVING INDUCTION HEATING EFFICIENCY
Filed April 24, 1958  4 Sheets-Sheet 3

INVENTORS
SAMUEL LEDERMAN
WILLIAM R. MACLEAN
BY
ATTORNEYS

INVENTORS
SAMUEL LEDERMAN
WILLIAM R. MAC LEAN
BY

ATTORNEYS

United States Patent Office 2,899,525
Patented Aug. 11, 1959

2,899,525
METHOD OF IMPROVING INDUCTION HEATING EFFICIENCY

Samuel Lederman and William R. MacLean, Brooklyn, N.Y., assignors to the United States of America as represented by the Secretary of the Air Force Application April 24, 1958, Serial No. 730,729

6 Claims. (Cl. 219—10.41)

This invention relates to induction heating and is more particularly concerned with a method for improving the efficiency of such heating.

One of the important uses of electromagnetic induction heating is in the simulation of aerodynamic heating of aircraft structures and structural models. Determinations of the structural strength of aircraft component parts can be readily made. However, the amount of energy required in order to simulate full scale heating conditions in high supersonic flight is very large, particularly if the structure is built of a non-ferrous material. With ferrous materials, heating efficiencies of about 90 percent can be obtained while with aluminum alloy specimens, the efficiency is always less than 50 percent. Since aircraft flying at Mach numbers of 2 to 3 can be satisfactorily manufactured of aluminum alloys, it is desirable to have some method by which the heating efficiency of such alloy structures can be increased.

Accordingly it is the primary object of this invention to provide a method for improving the induction heating efficiency of aluminum alloys.

A further object of our invention is to provide such improvement without detracting from desirable mechanical properties of the alloys.

Still further objects and advantages of the invention will become apparent from the ensuing detailed description thereof, especially when taken in conjunction with the accompanying drawings, in which.

Figure 6:
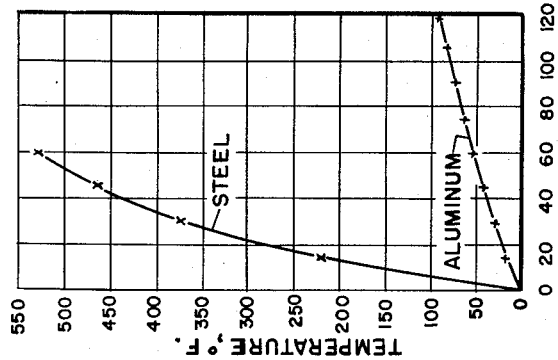
Figure 10:
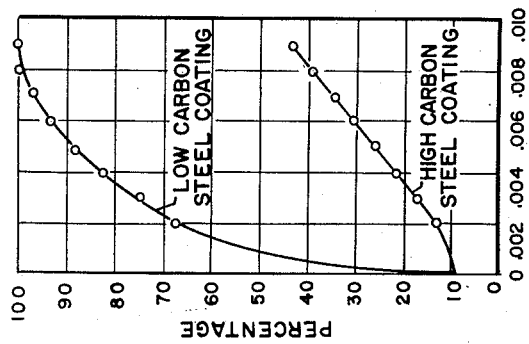
Figure 9:
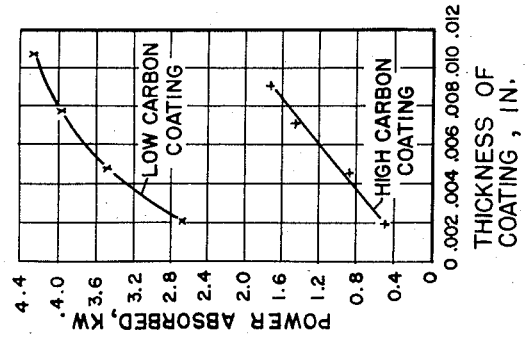
Figure 3:
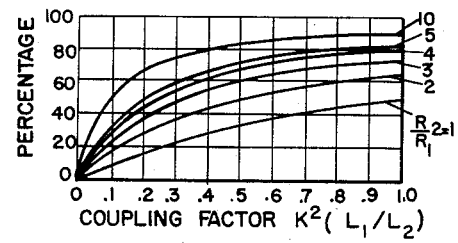
Figure 5:
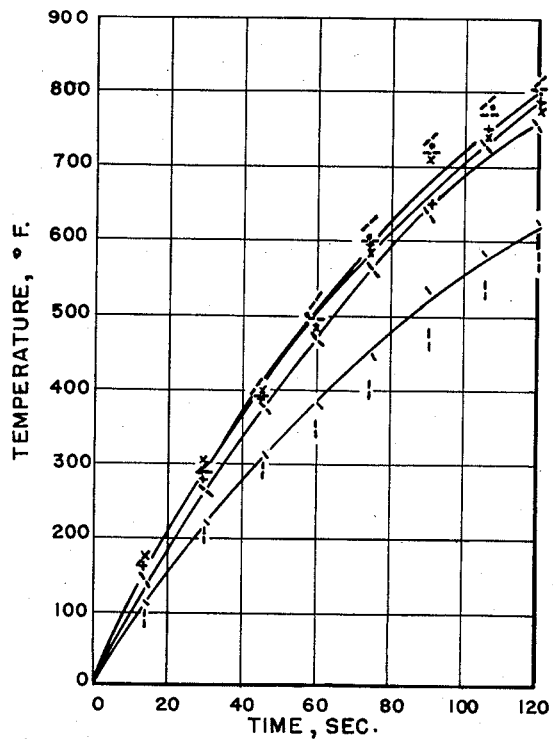
Figure 4:
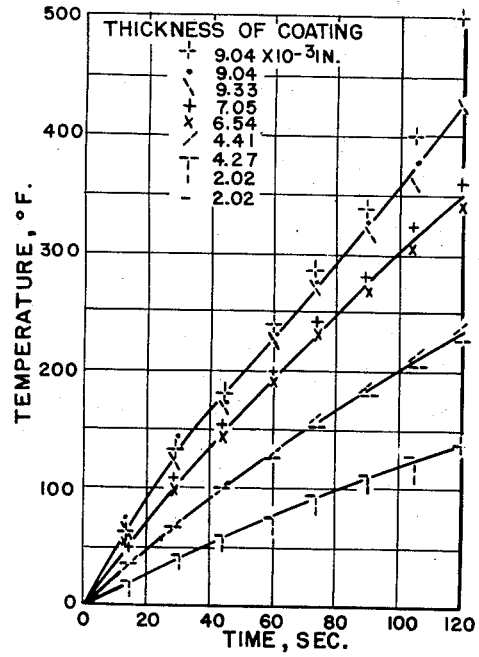
Figure 7:
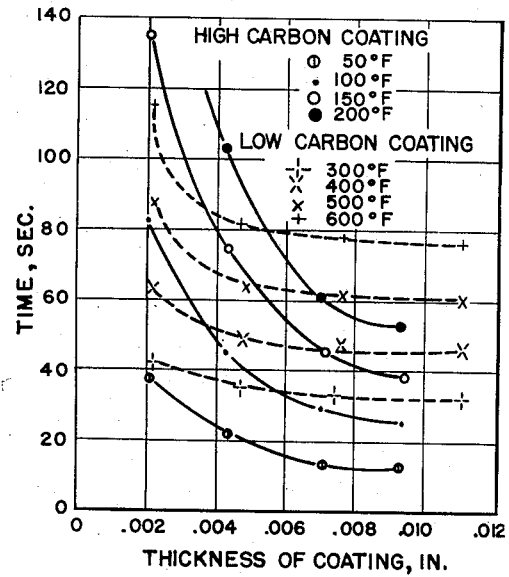
Figure 8:
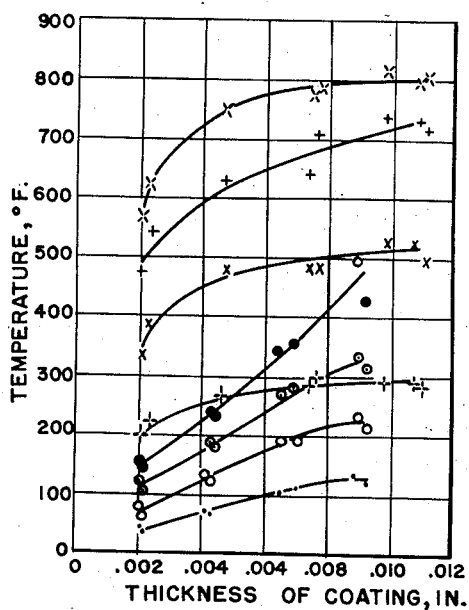
Figure 11:
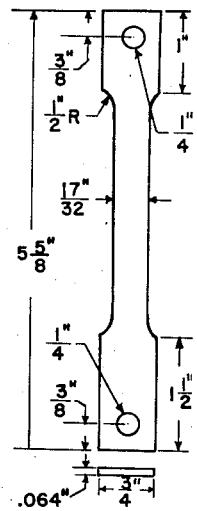
Figure 13:
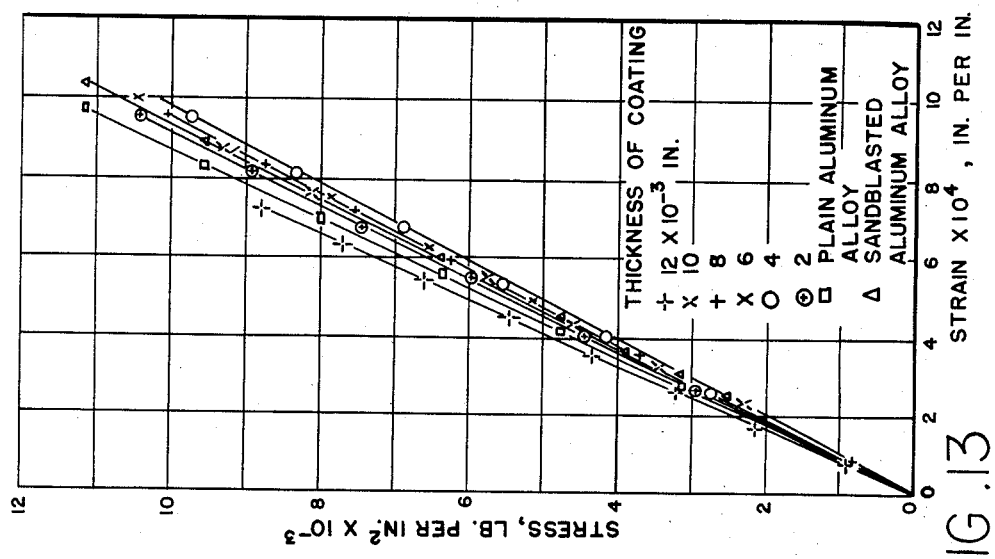
Figure 12:
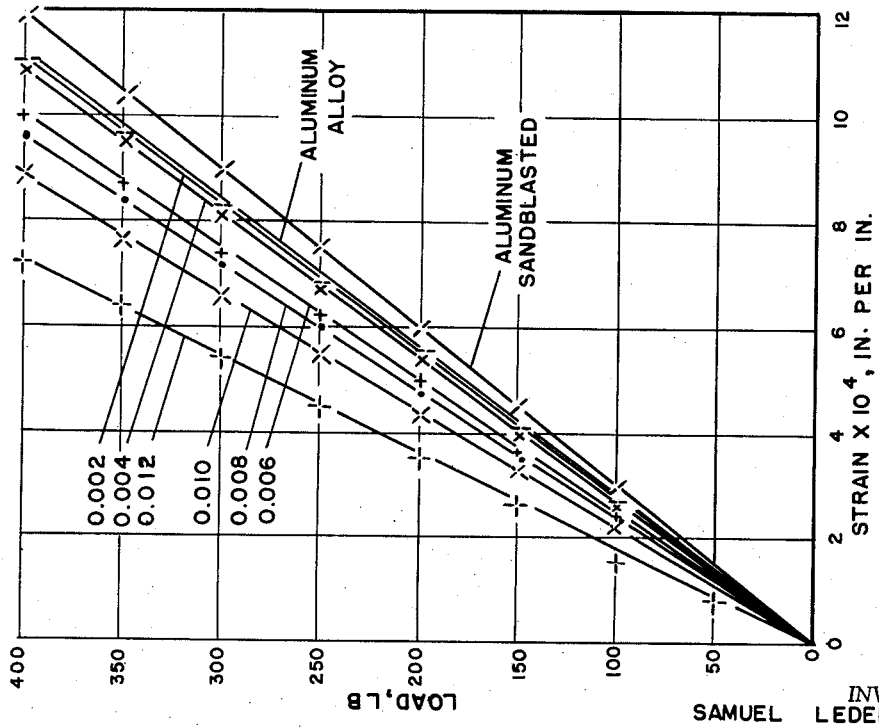

against Q;

Figure 3 is a graph showing the effect of the coupling factor on heating efficiency;

Figure 4 is a graph plotting temperature variations against time using a high carbon steel coating;

Figure 5 is similar to Figure 4 except that a low carbon steel coating is used;

Figure 6 plots temperature against time for pure aluminum and pure steel;

Figure 7 shows the variation in heating time with coating thickness;

Figure 8 shows the variation in temperature with coating thickness;

Figure 9 plots changes in power absorbed against coating thickness;

Figure 10 plots power absorption percentage against coating thickness;

Figure 11 is a dimensional view of a specimen used for testing mechanical properties of coated alloys;

Figure 12 plots strain against load for various coating thicknesses;

Figure 13 plots stress against strain for various coating thicknesses; and

Figure 14:
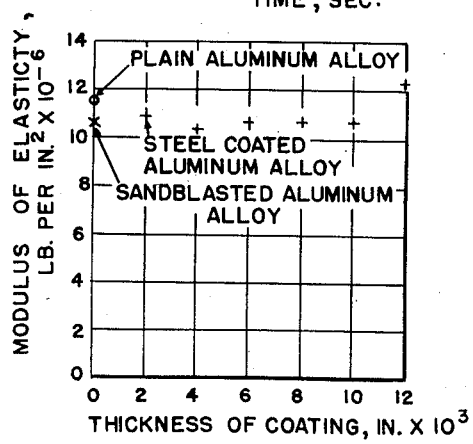

Figure 14 shows variations in the modulus of elasticity for various coating thicknesses.

Figure 1:
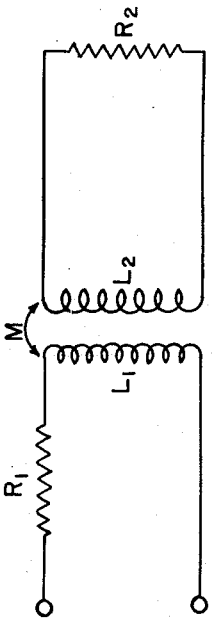
Figure 1 is a schematic diagram of the work circuit of an induction heating unit.

In order to best describe the principles of our invention, the theoretical basis must first be considered. The work circuit of an induction heating unit is similar to that of a transformer with the secondary short circuited, as seen in Figure 1. $R_1$ is the resistance of the heating coil, $L_1$ is the inductance of the coil, $M$ is the mutual inductance, $L_2$ is the inductance of the work sample, $I_1$ is the primary current, $I_2$ is the secondary current, $V_1$ is the voltage across the coil, and $j=(-1)^{½}$. The circuit relations are:

$$V_1 = (R_1 + j\omega L_1)I + j\omega M I_2 \qquad (a)$$
$$0 = j\omega M I_1 + (R_1 + j\omega L_2)I_2 \qquad (b)$$

The elimination of $I_2$ from the above equations yields for the impedance presented to the terminals of the generator:

$$\frac{V_1}{I_1} = R_1 + \frac{(\omega M)^2 R_2}{R_2^2 + (\omega L_2)^2} + j\omega\left[L_1 - \frac{(\omega M)^2 L_2}{R_2^2 + (\omega L_2)^2}\right] \qquad (c)$$

If the work sample is not present in the coil, $I_2 = 0$, and from Equation $a$ the impedance presented to the terminals of the generator is:

$$\frac{V_1}{I_1} = R_1 + j\omega L_1 \qquad (d)$$

A comparison of Equations $c$ and $d$ shows that the presence of a metallic sample in the work coil effectively increases the primary resistance and decreases the primary inductance.

Equation $c$ can be rewritten:

$$\frac{V_1}{I_1} = R_1 + \Delta R_1 + j\omega[L_1 - \Delta L_1] \qquad (e)$$

where $$\Delta R_1 = \frac{(\omega M)^2 R_2}{R_2^2 + (\omega L_2)^2} \qquad (f)$$

and $$\Delta L_1 = \frac{(\omega M)^2 L_2}{R_2^2 + (\omega L_2)^2} \qquad (g)$$

If $$\frac{\omega L_2}{R_2} = Q \qquad (h)$$

one may write Equations $f$ and $g$ in the form $$\Delta R_1 = \left(\frac{M}{L_2}\right)^2 R_2 \frac{Q^2}{Q^2+1} \qquad (i)$$

$$\Delta L_1 = \left(\frac{M}{L_2}\right)^2 L_2 \frac{Q^2}{Q^2+1} \qquad (j)$$

The efficiency of the heating circuit, that is the ratio of the power dissipated in the work to the total power supplied to the coil, is $$\eta = \frac{\Delta R_1}{R_1 + \Delta R_1} = \frac{\left(\frac{M}{L_2}\right)^2 R_2 \frac{Q^2}{1+Q^2}}{R_1 + \left(\frac{M}{L_2}\right)^2 R_2 \frac{Q^2}{1+Q^2}} \qquad (k)$$

Figure 2:
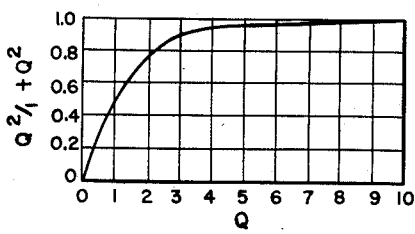
Fig. 2 is a graph plotting $$\frac{Q^2}{1+Q^2}$$

The Q of the secondary circuit is much larger than unity for most frequencies used in industrial heating. In Figure 2, $$\frac{Q^2}{1+Q^2}$$

is plotted against Q. From the graph we see that for $Q=7$ the factor $$\frac{Q^2}{1+Q^2} = .98 \simeq 1$$

Consequently Equation $k$ can be written as:

$$\eta = \frac{\left(\frac{M}{L_2}\right)^2 R_2}{R_1+\left(\frac{M}{L_2}\right)^2 R_2} = \frac{\left(\frac{M}{L_2}\right)^2 \frac{R_2}{R_1}}{1+\left(\frac{M}{L_2}\right)^2 \left(\frac{R_2}{R_1}\right)} \quad (l)$$

This equation shows that the efficiency of heating is 50 percent if $$\frac{M}{L_2} = 1$$

which corresponds to a coupling efficiency of 100 percent, and if $R_2 = R_1$. If it is desired that the heating efficiency be increased, the ratio $$\frac{R_2}{R_1}$$

must be increased. But in the case of induction heating, R depends not only on the geometry and the conductivity of the material, but also on its permeability. The equation defining the resistance R of the material per unit area is $$R = \left(\frac{16}{3\pi}\right)\left(\frac{\omega\mu}{2\sigma}\right)^{\frac{1}{2}} \quad (m)$$

where $\mu$ is the permeability, $\sigma$ is the conductivity, and the frequency is $\omega = 2\pi\phi$.

Aluminum and copper have about the same conductivity and permeability. If the model to be heated is of aluminum, and the coil of copper, with the usual geometry of the set-up $R_2 \approx R_1$, and from Equation 1 the heating efficiency is less than 50 percent. The efficiency is much higher if the model is of steel because the permeability of steel is very high, and its conductivity is considerably smaller than that of copper. This is the reason why spraying the surface of an aluminum model with steel increases the efficiency of induction heating.

Equation 1 can be written in a slightly different form if the symbol $k$ is introduced in accordance with the definition $$k = \frac{M}{(L_1 L_2)^{\frac{1}{2}}} \quad (n)$$

This symbol stands for the coupling whose maximum theoretically possible value is unity. Substitution yields $$\eta = \frac{\left(\frac{M}{L_2}\right)^2 \frac{R_2}{R_1}}{1+\left(\frac{M}{L_2}\right)^2 \left(\frac{R_2}{R_1}\right)} = \left\{\frac{k^2\left(\frac{L_1}{L_2}\right)\left(\frac{R_2}{R_1}\right)}{1+k^2\left(\frac{L_1}{L_2}\right)\left(\frac{R_2}{R_1}\right)}\right\} \quad (o)$$

In Figure 3, $\eta$ is plotted as a function of $$k^2\left(\frac{L_1}{L_2}\right)$$

with $$\left(\frac{R_2}{R_1}\right)$$

as the parameter. The graph shows that if $$\left(\frac{R_2}{R_1}\right)$$

is large enough, not only is the heating efficiency high, but it changes comparatively little when the coupling is changed. For instance with a value of 10 for $(R_2/R_1)$ and for $k^2(L_1/L_2) = 0.7$, the heating efficiency is 87.5 percent; when the coupling factor is increased to $k^2(L_1/L_2) = 1$, the efficiency rises only to 90.0 percent. Thus with a higher resistance ratio it is possible to use looser coupling, which gives a more uniform distribution of heating, and it is possible to use higher voltage work coils without danger of sparking. Furthermore, the higher resistance load allows the matching of the load to the generator without the use of matching transformers, or excessive numbers of turns in the work coil, which by themselves would increase the voltage across the work coil.

Efficiency values of the order of magnitude given in the examples can be reached with steel coated aluminum alloy specimens only if the thickness of the coating is sufficiently large. It is well known that in the induction heating process the heat is generated only in a comparatively thin surface layer of the material. The depth of penetration depends upon the properties of the material and upon the frequency of the current. It can be shown theoretically that the depth at which the amplitude of the electric field vector is equal to $1/\theta$ (=0.3679) times the value at the surface of the material, is given by the formula $$\delta = (2/\omega\mu\sigma)^{\frac{1}{2}} = (\pi\phi\mu\sigma)^{\frac{1}{2}} \quad (p)$$

where $\mu$ is the permeability, the frequency $\omega = 2\pi\phi$, and $\delta$ is the conductivity. At a distance from the surface equal to one wave length, the electric field strength vector has a value equal to $\theta^{-2\pi}$ of its value at the surface, and at the same place the energy transported is only about $4 \times 10^{-6}$ times the value at the surface. These connections indicate that the coating thickness necessary for a given improvement in the heating efficiency decreases if the frequency of the current is increased.

It must not be forgotten that the heat is generated only in the coating of the specimens. From the steel coating the heat must be transferred to the aluminum alloy by means of conduction. This naturally reduces the efficiency of the heating process; however the experiments hereinafter described show that considerable improvements in efficiency can be achieved with the aid of steel spraying.

The accuracy of the theoretical considerations was checked by tests run with a 20 kw. induction heater. The test specimens were 7 inches in diameter, 10 inches long, and had a wall thickness of the aluminum of 0.064 inch. The specimens were sandblasted, and then each was sprayed with one of two types of steel. One set of tests was run with a high carbon steel while a low carbon steel was employed in a second set of tests. The thickness of the coating was varied from 0.002 inch to 0.012 inch. The coated specimens were placed in a specially designed coil and heated for about two minutes. Temperature readings were taken every fifteen seconds at three points on each specimen. The chemical composition of the steels used is as follows:

|  | High Carbon Wire | High Carbon Spray | Low Carbon Wire | Low Carbon Spray |
|---|---|---|---|---|
| Carbon_____percent__ | 0.80 | 0.70 | 0.14 | 0.10 |
| Manganese_____do____ | 0.48 | 0.36 | 0.46 | 0.34 |
| Silicon_____do____ | 0.12 | 0.16 | 0.06 | 0.02 |
| Copper_____do____ | 0.45 | 0.36 | | |
| Density, gms./cm.³ | 6.36 | 4.27 | 6.67 | 3.72 |

These percentages were obtained by chemical analysis of the steels before and after spraying. A spectrographic analysis after spraying gave the following estimates:

|  | High Carbon Spray | Low carbon Spray |
|---|---|---|
| Iron_____ | major | major |
| Copper_____ | .X | .X low |
| Manganese_____ | .X low | .X low |
| Silicon_____ | .0X-0.X | .0X low |
| Nickel_____ | .0X low | .0X low |
| Chromium_____ | .00X | .00X |
| Vanadium_____ | .00X | .00X |
| Molybdenum_____ | .00X | .00X |
| Tin_____ | .00X | .00X |
| Aluminum_____ | N.F. | .0X low |

Figure 4 shows the results of a series of tests carried out with the aluminum alloy specimens coated with high carbon steel. The temperature of the specimen is plotted against time, and the parameter of the family of curves is the thickness of the steel coating. In Figure 5, similar data is presented for tests wherein the specimens were coated with low carbon steel. In order to more clearly indicate the efficacy of the spray coatings, Figure 6 contains heating curves for pure steel and pure aluminum.

In Figures 7 and 8 the same test results are presented in a different form. Here the ordinate is the coating thickness. Figure 7 shows the length of time necessary to reach a predetermined elevated temperature at any particular thickness of coating. In Figure 8 the parameter of the family of curves is the time of heating; the graph shows the temperatures reached with any arbitrary thickness of coating.

These figures plainly illustrate that the coating of the specimens is most effective in increasing the heating efficiency of the induction heating unit. This conclusion can be drawn perhaps even more forcefully from the data presented in the graphs of Figures 9 and 10. In the former the power absorbed by the specimen is plotted against thickness of the coating. Naturally the temperature of the specimen rises more rapidly if the specimen absorbs more power. In Figure 10 the relative power absorptive capacity of the coated specimen is plotted against the thickness of the coating. The relative power absorption is defined as the ratio of the power absorbed by the particular specimen to that absorbed by a pure steel specimen. It can be seen from this figure also that increases in the coating thickness result in higher efficiencies of the heating process. It appears that the increases in efficiency become insignificant at a thickness of about 0.009 inch when the coating material is low carbon steel. However with high carbon steel the efficiency is still rising rapidly at this thickness of coating.

All of the results presented thus far refer to tests carried out with specimens which had not been heated previously. A repetition of the heating process gives considerably different results. When a specimen was heated for a second or third time, an increase in heating efficiency was generally observed. This increase was comparatively small with the low carbon steel coated specimens but was relatively large with the specimens coated with high carbon steel. It has been conjectured that during the heating process the individual kernels of steel sprayed on the surface are sintered and melted into a layer which is much more uniform than the spray in its initial state. This change in the structure of the coating naturally has an effect upon the electromagnetic properties of the layer. Further investigation of this phenomenon is now in progress.

It is to be anticipated that the application of a steel coating to a thin aluminum alloy specimen has an influence upon the mechanical behavior of the specimen. This effect should be small when the aluminum alloy specimen is comparatively thick and the coating thin; conversely the effect may be large if a thick coating is applied to a thin specimen. In order to explore this effect, a series of tensile tests were carried out with specimens manufactured in accordance with ASTM specifications. One such specimen, complete with dimensions, is shown in Figure 11.

The results of the tests are shown in the graphs of Figure 12 and 13. In the former, the load measured in the test is plotted against the strain, with the thickness of the coating as the parameter of the family of curves.

In Figure 13 the results are replotted in the form of stress-strain diagrams.

As the application of high temperatures to structures very often results in buckling of the plate and steel type elements thereof, and as the buckling process depends to a large extent upon the modulus of elasticity of the material, the results shown in the preceding figures were evaluated in order to obtain the effect of the coating on the apparent modulus of elasticity of the specimens. This data is plotted in Figure 14. The graph shows that the steel coating of aluminum alloy specimens has only a small effect on the effective modulus of elasticity. This may be due to the fact that the sprayed material is not entirely contiguous, and that its apparent density is considerably less than the density of solid steel.

Our invention thus provides a method for producing a considerable increase in the heating efficiency of induction heating processes. It is to be understood that the above description is merely illustrative of the principles of the invention. Other and different applications may be devised by those skilled in the art without departing from the spirit and scope of this invention.

What we claim is:

1. A method for improving the heating efficiency of induction heating comprising the steps of forming an aluminum member to be heated, spray coating said member with a layer of steel having a thickness of from $2\times10^{-3}$ to $9\times10^{-3}$ inches, and placing said coated member in an induction heating unit.

2. A method for improving the efficiency of induction heating comprising the steps of forming an aluminum alloy member to be heated, coating said member with a layer of low carbon steel having a thickness of from $2\times10^{-3}$ to $9\times10^{-3}$ inches, and placing said coated member in an induction heating unit.

3. A method of improving the efficiency of induction heating comprising the steps of providing an aluminum alloy member to be heated, coating said member with a layer of high carbon steel of a thickness of at least $2\times10^{-3}$ inches, and subjecting said coated member to induction heating.

4. A method of improving the efficiency of induction heating of aluminum comprising the steps of providing an aluminum alloy member to be heated, coating said member with a layer of steel having a thickness of from $2\times10^{-3}$ to $9\times10^{-3}$ inches, said steel having a carbon content of about .10%, and subjecting said coated member to induction heating.

5. A method of improving the efficiency of induction heating of aluminum comprising the steps of providing an aluminum member to be heated, spray coating said member with a layer of steel having a thickness of from $2\times10^{-3}$ to $12\times10^{-3}$ inches, the carbon content of said steel being about .70%, and subjecting said coated member to induciton heating.

6. The method defined in claim 5 wherein the step of subjecting said member to induction heating includes at least one reheating thereof.

References Cited in the file of this patent

UNITED STATES PATENTS

| | | |
|---|---|---|
| 1,568,080 | Meadowcraft | Jan. 5, 1926 |
| 2,393,541 | Kohler | Jan. 22, 1946 |
| 2,653,210 | Becker et al. | Sept. 22, 1953 |
| 2,657,298 | Andrus | Oct. 27, 1953 |